Patented June 2, 1925.

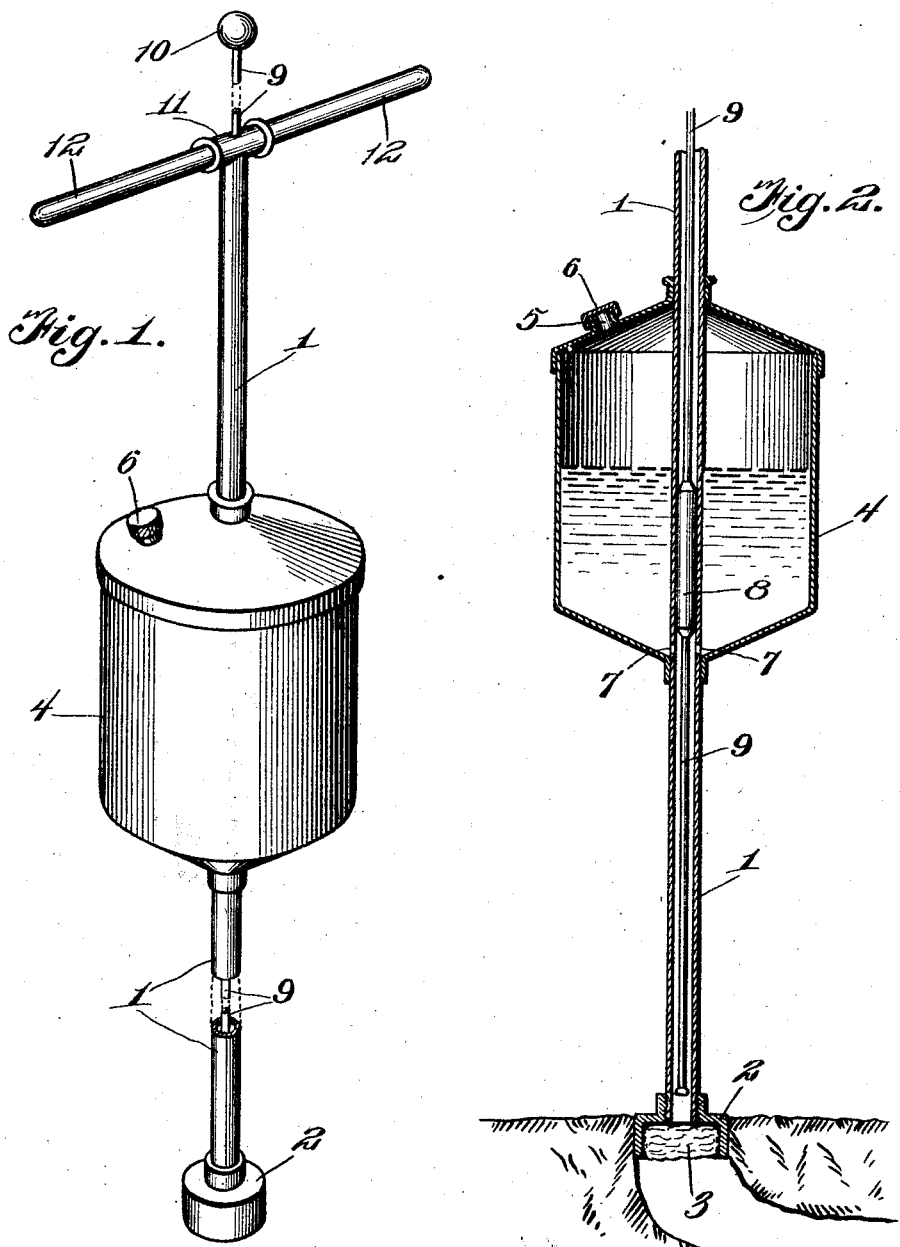

1,540,660

UNITED STATES PATENT OFFICE.

THEODORE T. SNOW, OF SIOUX FALLS, SOUTH DAKOTA.

ANIMAL EXTERMINATOR.

Application filed October 6, 1923, Serial No. 667,001. Renewed November 13, 1924.

*To all whom it may concern:*

Be it known that I, THEODORE T. SNOW, a citizen of the United States, residing at Sioux Falls, in the county of Minnehaha and State of South Dakota, have invented certain new and useful Improvements in Animal Exterminators, of which the following is a specification, reference being had to the accompanying drawings.

This invention relates to certain improvements in animal exterminators and has relation more particularly to a device of this general character especially designed and adapted for use in the destruction of gophers such as prairie dogs, and it is an object of the invention to provide a device of this general character embodying novel and improved means whereby a liquid destroying agency may be conveniently and effectively applied within a burrow.

Another object of the invention is to provide a novel and improved device of this general character including a tubular member in communication with a source of liquid poison together with a receptacle carried by said member adapted to contain a cartridge or wad adapted to be saturated by the liquid together with means for controlling the delivery of such liquid to the cartridge or wad and for ejecting such cartridge or wad from the container.

The invention consists in the details of construction and in the combination and arrangement of the several parts of my improved animal exterminator whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective with portions broken away of an animal exterminator constructed in accordance with an embodiment of my invention; and Figure 2 is a longitudinal sectional view taken through the device as illustrated in Figure 1, with certain of the parts in elevation and the device shown as applied for operation.

As disclosed in the accompanying drawing, 1 denotes an elongated tubular member having in threaded engagement with one end portion thereof, a cup-shaped container 2 in which is adapted to be fitted a cartridge or wad 3 of suitable absorbent material.

The member 1 is disposed through a container 4 of suitable capacity and which has its bottom wall substantially conical in form with the member 1 disposed through the apex portion of such bottom wall. The top wall of the container 4 is provided with a filling opening 5 normally closed by the cap 6.

The portion of the member 1 within the container 4 and immediately adjacent to the apex portion of the bottom wall of the container is provided with the perforations 7 affording communication between the container 4 and the interior of the tubular member 1. The container 4 is adapted to hold a supply of poison liquid of a type to diffuse fumes destructive of animal life, said liquid being preferably of a type wherein the emitted fumes are heavier than air.

The passage of the fluid from the container 4 through the openings 5 is under control of a valve 8 mounted upon a rod 9 extending longitudinally through the member 1. The rod 9 is of a length to extend beyond the outer end of the member 1 or that end portion remote from the container 2 and the exterior portion of the rod 9 is provided with an operating knob or handle 10. The rod 9 is of such length that when the valve 8 is in closed position additional inward movement of the rod will eject the cartridge or wad 3 from within the container 2. It is also to be noted that the valve 8 constitutes a cylindrical member snugly fitting within the tubular member 1 and is of such length to maintain the openings 5 closed during the movement of the rod 9 to effect the ejecting or discharge of the cartridge or wad 3.

The outer end of the member 1 as herein disclosed has connected therewith a T 11 having in threaded engagement with the end portions thereof the handle sections 12.

In practice, the valve 8 is normally in closed position and after the cartridge or wad 3 has been properly fitted within the container 2, said container is inserted a desired distance within the entrance end of a burrow. The rod 9 is then pulled upwardly a distance sufficient to permit the fluid within the container 4 to flow through the openings 5 into the member 1 and down to the applied cartridge or wad 3. After saturation of the cartridge or wad 3, the rod 9 is moved inwardly of the member 1 to close the openings 5 and also to an extent sufficient to eject the cartridge or wad 3 from the container 2. By this means the cartridge or wad 3 is positioned within the burrow and the fumes emitted therefrom serve effectually to exterminate all animal life within the burrow.

From the foregoing description it is thought to be obvious that an animal exterminator constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A gopher exterminator comprising, in combination, a tubular member, a container carried by one end portion thereof and in communication with the member, said container being adapted to be inserted within a burrow, a wad of absorbent material adapted to be fitted within the container, a second container carried by the tubular member and in communication therewith, a rod disposed through the tubular member, a valve carried by said rod for closing the communication between the member and the second container, said rod being of a length to contact with an applied cartridge and force the same out of the first container upon inward movement of the rod, the valve closing the communication betweeen the tubular member and the second container during the period the rod is operated to eject the cartridge.

2. A device of the class described comprising a tubular member adapted for communication with a source of liquid poison, a container carried by one end portion of said member and in communication therewith, a cartridge of absorbent material to be engaged within the container, and means insertible through the member for ejecting the cartridge.

3. A device of the class described comprising a tubular member adapted for communication with a source of liquid poison, a container carried by one end portion of said member and in communication therewith, a cartridge of absorbent material to be engaged within the container, and means insertible through the member for ejecting the cartridge, said means operating to control the communication of the member with the source of liquid supply.

In testimony whereof I hereunto affix my signature.

THEODORE T. SNOW.